United States Patent
Furuse et al.

(10) Patent No.: US 12,402,615 B2
(45) Date of Patent: Sep. 2, 2025

(54) FISHING REEL

(71) Applicant: GLOBERIDE, Inc, Higashikurume (JP)

(72) Inventors: Saki Furuse, Higashikurume (JP); Motohiro Nonogaki, Higashikurume (JP); Toshiaki Kobatake, Higashikurume (JP)

(73) Assignee: GLOBERIDE, Inc., Tokyo (JP)

( * ) Notice: Subject to any disclaimer, the term of this patent is extended or adjusted under 35 U.S.C. 154(b) by 173 days.

(21) Appl. No.: 18/384,110

(22) Filed: Oct. 26, 2023

(65) Prior Publication Data

US 2024/0188550 A1 Jun. 13, 2024

(30) Foreign Application Priority Data

Dec. 12, 2022 (JP) .................................. 2022-197745

(51) Int. Cl.
 *A01K 89/01* (2006.01)
 *A01K 89/027* (2006.01)
 *A01K 89/033* (2006.01)

(52) U.S. Cl.
 CPC ............ *A01K 89/027* (2013.01); *A01K 89/05* (2015.05)

(58) Field of Classification Search
 CPC ........ A01K 89/01915; A01K 89/01912; A01K 89/01916; A01K 89/01917; A01K 89/01919
 See application file for complete search history.

(56) References Cited

U.S. PATENT DOCUMENTS

| | | | | |
|---|---|---|---|---|
| 2015/0150229 A1* | 6/2015 | Umezawa | ........ | A01K 89/01918 242/258 |
| 2016/0183508 A1* | 6/2016 | Kano | ............... | A01K 89/01916 242/223 |

FOREIGN PATENT DOCUMENTS

| | | | | |
|---|---|---|---|---|
| JP | 2014-000045 A | 1/2014 | | |
| WO | WO-2013180061 A1 * | 12/2013 | ....... | A01K 89/01912 |

* cited by examiner

*Primary Examiner* — Emmanuel M Marcelo
(74) *Attorney, Agent, or Firm* — Oliff PLC (57) ABSTRACT

A level winding device for a fishing reel comprises a tubular body that rotates in conjunction with ON/OFF operation of a clutch mechanism, a worm shaft that is accommodated in the tubular body and rotationally driven by a rotational operation of a handle, a holding body that comprises an engagement pin engaged with a spiral groove of a worm shaft and holds a fishing line insertion portion through which a fishing line is inserted, and two circumferential detent portions (a rib and a recessed portion) provided in the holding body and the tubular body such that two bodies rotate integrally. The two circumferential detent portions are provided on the tubular body at an interval of approximately 180°, and an axial detent portion that suppresses rattling of the holding body in an axial direction of the tubular body is provided at an intermediate position between the two circumferential detent portions.

4 Claims, 7 Drawing Sheets

FISHING REEL

CROSS-REFERENCE TO RELATED APPLICATION

This application claims priority under 35 U.S.C. § 119 to Japanese Patent Application No. 2022-197745 filed on Dec. 12, 2022 in the Japanese Patent Office, the entire contents of each hereby incorporated by reference.

BACKGROUND OF THE INVENTION

1. Technical Field

The present invention relates to a fishing reel comprising a fishing line guide body that winds and guides a fishing line around a spool between side plates in front of the spool.

2. Description of the Related Art

In the related art, in a double-bearing type fishing reel, a level winding device is disposed to evenly wind a fishing line around a spool rotatably supported between left and right side plates. The level winding device includes a fishing line guide body that reciprocates left and right in front of the spool in conjunction with a winding operation of a handle rotatably arranged on one side plate side, and the fishing line can be evenly wound around the spool by inserting the fishing line into the fishing line guide body.

A configuration is known in which the above-described fishing line guide body includes an opening in which an opening region is formed wide so as to reduce resistance at the time of releasing the fishing line and a narrow portion that guides the fishing line at the time of winding the fishing line, and the fishing line guide body is turned in conjunction with a switching operation of a clutch (see, for example, JP 2014-000045 A). In such a configuration, since the opening is located in front of the spool when the clutch is turned OFF, the fishing line wound around the spool during a casting operation does not receive a large resistance from the inner surface of the opening of the fishing line guide body, and stable casting can be performed while suppressing a decrease in a flying distance of a tackle. In addition, when the clutch is returned to ON, the narrow guide portion is located in front of the spool, so that the fishing line can be evenly wound around the spool.

The fishing line guide body described above is attached to a holding body that is movable in an axial direction (left-right direction) and integrally turns together with a tubular body with respect to the tubular body that turns in conjunction with the clutch operation. The holding body is provided with an engagement pin that engages with a spiral groove of a worm shaft disposed in the tubular body, and when the worm shaft is rotationally driven together with a rotational operation of the handle, the fishing line guide body is movable in the axial direction by an engagement relationship between the spiral groove and the engagement pin.

Further, the tubular body and the holding body are configured to be integrally rotatable. In the configuration disclosed in JP 2014-000045 A, ribs extending in the axial direction are formed at intervals of approximately 180° on the outer surface of the tubular body, and the ribs are fitted into recessed portions formed in the holding body along the axial direction to integrally rotate. That is, when the tubular body is rotationally driven by the clutch operation, the holding body (the fishing line guide body) is configured to be integrally rotationally movable together with the tubular body by the fitting relationship described above.

SUMMARY OF THE INVENTION

In the double-bearing reel described above, the tubular body and the holding body (the fishing line guide body) can be integrally rotated by the fitting relationship between the two ribs and the recessed portions. The rotation of the holding body is performed when the fishing line is not wound around the spool, that is, when the clutch mechanism is turned ON and OFF, and the fishing line guide body is stopped in the axial direction. The holding body slides in the axial direction with respect to the tubular body by winding a handle in a state where the clutch mechanism is turned on.

Figure 6A:
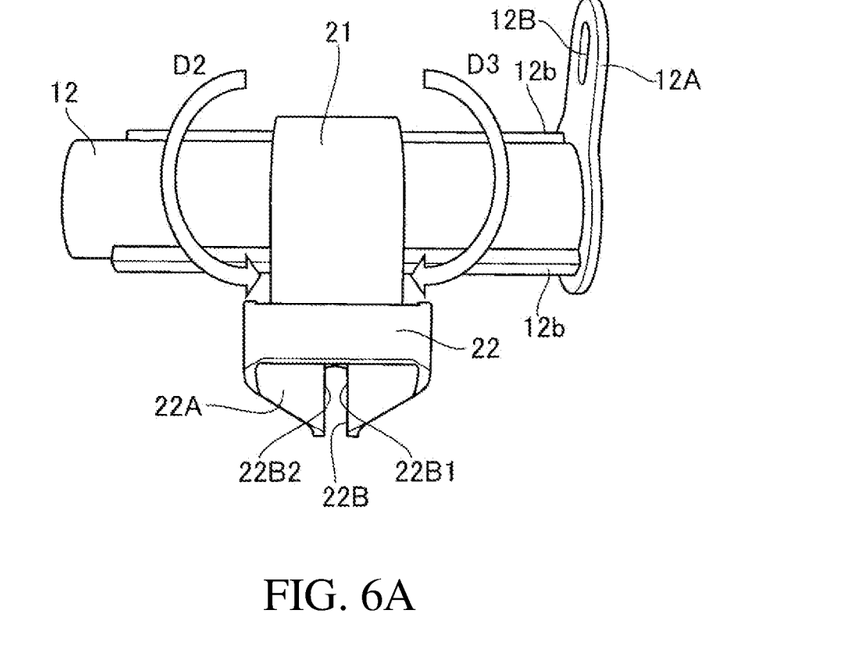
FIG. 6A is a front view for explaining the action of the fitting relationship of the related art.
Figure 6B:
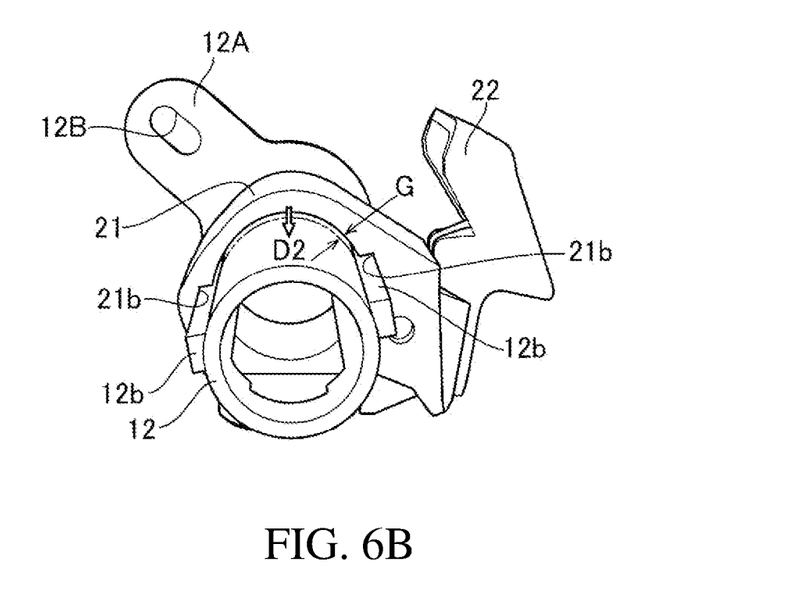
FIG. 6B is a side view of FIG. 6A.

The holding body of the related art has a problem that the holding body tends to rattle in the axial direction (a rattling that swings as indicated by arrows D2 and D3 in FIG. 6) when reciprocally driven in the axial direction (left-right direction). Then, when the holding body rattles in this manner, the fishing line cannot be neatly wound around the spool at the time of winding operation of the fishing line, and resistance is generated at the time of releasing the next fishing line. In addition, since the holding body rattles, an abnormal noise occurs at the time of winding operation, particularly at the time of winding operation at a high speed, and a sense of precision is lost.

The present invention has been made in view of the above problems, and an object of the present invention is to provide a fishing reel having a configuration in which a fishing line guide body is swung, in which rattling of the fishing line guide body in an axial direction is suppressed during a winding operation of a fishing line.

In order to achieve the above object, a fishing reel according to the present invention comprises: a spool rotatably supported between left and right side plates of a reel main body; a clutch mechanism that switches the spool between a fishing line winding state and a fishing line releasing state; and a level winding device that evenly winds a fishing line around the spool when the clutch mechanism rotates a handle in an ON state, in which the level winding device comprises a tubular body rotatably supported between left and right side plates of a reel main body and configured to rotate in conjunction with ON and OFF operation of the clutch mechanism, a worm shaft accommodated in the tubular body and rotationally driven by a rotational operation of the handle, a holding body comprising an engagement pin engaged with a spiral groove of the worm shaft and configured to hold a fishing line insertion portion through which a fishing line is inserted, and two circumferential detent portions provided in the holding body and the tubular body so that the holding body and the tubular body integrally rotate, the two circumferential detents are provided on the tubular body at an interval of approximately 180°, and an axial detent portion that prevents the holding body from rattling in the axial direction of the tubular body is provided at an intermediate position between the two circumferential detents.

According to the fishing reel having the above-described configuration, the tubular body constituting the level winding device and the holding body holding the fishing line insertion portion integrally rotate together with the clutch operation by the two circumferential detent portions. The two circumferential detent portions are provided on the tubular body at an interval of approximately 180°, and an axial detent portion that suppresses rattling of the holding body in the axial direction of the tubular body is provided at an intermediate position thereof. Therefore, when the fishing line is wound around the spool, the holding body is prevented from rattling along the axial direction even if the holding body holding the fishing line insertion portion is reciprocally driven between the left and right side plates. As described above, since the holding body does not rattle along the axial direction, the fishing line is accurately wound around the spool, and generation of the abnormal noise due to rattling is suppressed.

According to the present invention, in a fishing reel having a configuration in which a fishing line guide body is swung, it is possible to obtain a fishing reel in which rattling of the fishing line guide body in an axial direction is suppressed during a winding operation of a fishing line.

DETAILED DESCRIPTION

Hereinafter, an embodiment of a fishing reel according to the present invention will be described with reference to FIGS. 1 to 5B.

Note that in the following description, a front-rear direction (front side, rear side), a left-right direction, an up-down direction (upper side, lower side) are defined as directions illustrated in FIG. 1.

Figure 1:
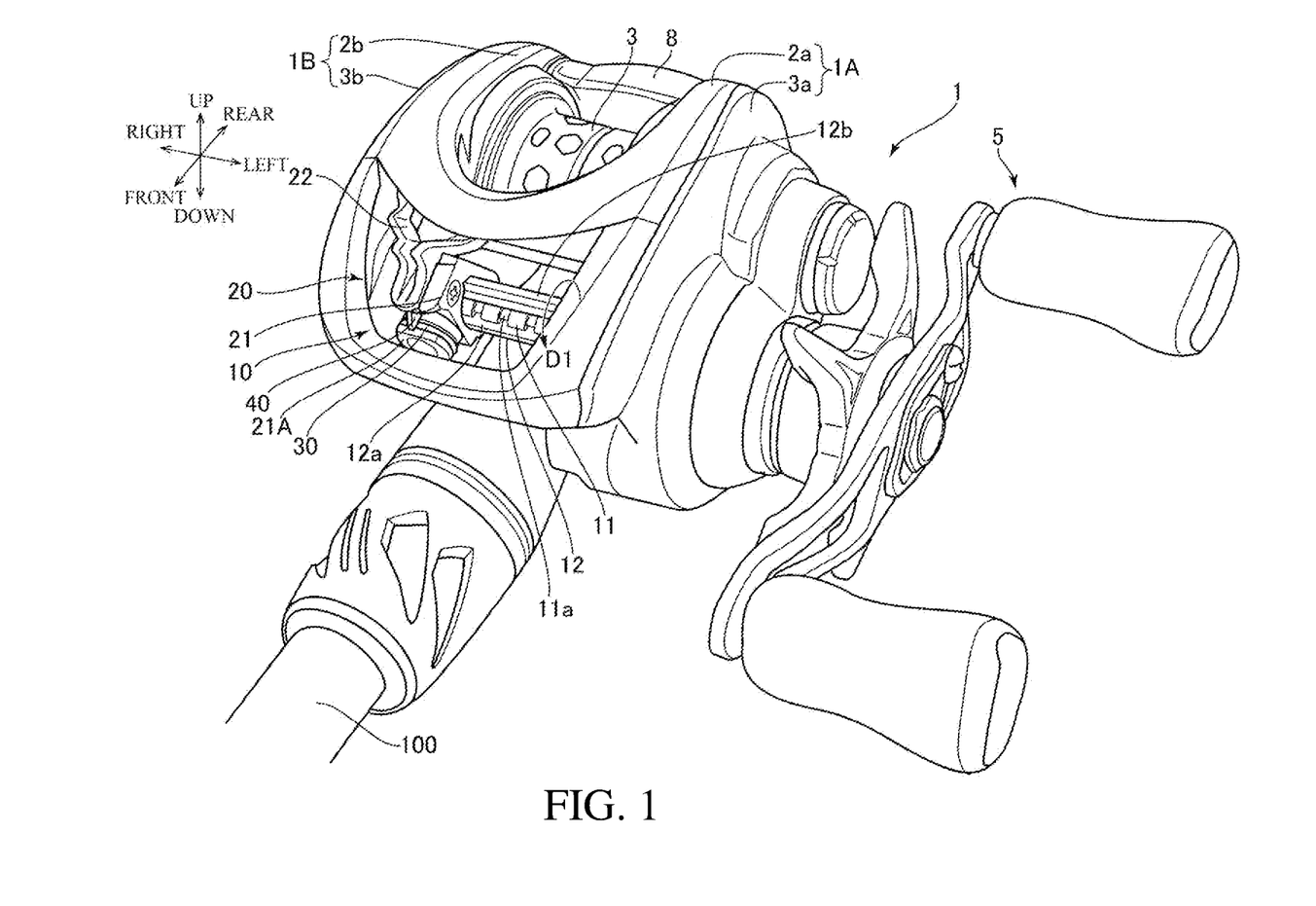
FIG. 1 is a perspective view illustrating an embodiment of a fishing reel according to the present invention as viewed from a front side.

As illustrated in FIG. 1, the fishing reel according to the present embodiment comprises a reel main body 1 having left and right side plates 1A and 1B in which left and right frames 2a and 2b are covered with left and right covers 3a and 3b, respectively. In the reel main body 1, reel legs located between the left and right side plates and attached to a fishing rod 100 are integrally formed. A spool shaft is rotatably supported between the left and right frames 2a and 2b via a bearing, and a spool 3, around which a fishing line is wound, is integrally fixed to the spool shaft.

In the present embodiment, a handle 5 that rotationally drives the spool 3 is installed on the left side plate 1A side, and a known power transmission mechanism that transmits a rotational driving force of the handle 5 to the spool shaft is disposed in a space between the left frame 2a and the left cover 3a. A known clutch mechanism that switches the spool shaft between the power transmission state and the power interruption state is disposed on one of the side plates, and the clutch mechanism switches from the clutch-ON state (power transmission state) to the clutch-OFF state (power interruption state) by pushing down a clutch lever 8 disposed between the left and right side plates on the rear side of the spool 3. The return from the clutch-OFF state to the clutch-ON state can be performed by rotationally operating the handle 5 by a known automatic return mechanism.

A level winding device 10 is disposed on the front side of the spool 3 between the left and right side plates 1A and 1B. The level winding device 10 comprises a fishing line guide body 20 through which the fishing line wound around the spool 3 is inserted, a worm shaft (screw shaft) 11 rotationally driven through the driving force transmission mechanism, and a tubular body (cylindrical body) 12 that accommodates the worm shaft 11, and is configured to be reciprocally driven to the left and right when an engagement pin provided on the fishing line guide body 20 is engaged with the worm shaft 11.

The worm shaft 11 is accommodated in the tubular body 12 rotatably held between the left and right side plates, and a long hole 12a extending in the axial direction is formed in an outer surface of the tubular body 12. A spiral groove 11a is formed on the surface of the worm shaft 11, and the spiral groove 11a is exposed through the long hole 12a. In addition, the fishing line guide body 20 comprises a holding body (main body) 21 integrally formed of resin or the like, and a fishing line insertion portion 22 integrally fixed to an upper portion of the holding body 21 and through which the fishing line is actually inserted. A through hole 21a is formed in the holding body 21 along the left-right direction, and is disposed and formed so as to surround the tubular body 12. That is, the tubular body 12 is inserted through the through hole 21a of the holding body 21.

The tubular body 12 is rotatably driven by a predetermined angle in accordance with the operation of the clutch lever 8 of the clutch mechanism. Specifically, when the clutch lever 8 is pushed down from the clutch-ON state illustrated in FIG. 1 to the clutch-OFF state, the tubular body 12 is rotatably driven to the front side (a direction of arrow D1 in FIG. 1). Note that the power transmission mechanism that rotates and drives the tubular body 12 when the clutch lever 8 is pushed down can be performed by, for example, a power transmission mechanism similar to the configuration disclosed in JP 2014-000045 A described above. That is, when the clutch lever 8 is pushed down, the clutch plate (not shown) is rotationally driven, and the tubular body 12 is rotationally driven via the engagement protrusion (not illustrated) of the clutch plate engaged with the long hole 12B of the rotation plate 12A non-rotationally fixed to the tubular body 12.

Figure 3:
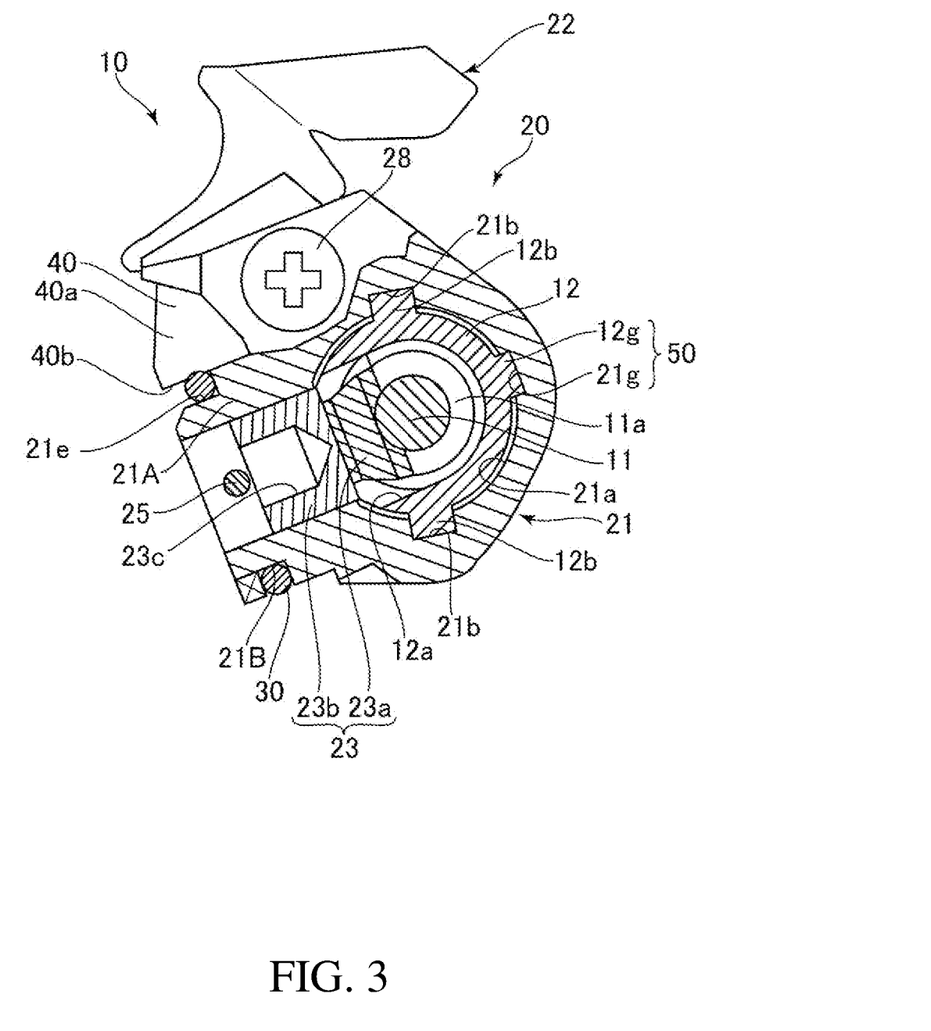
FIG. 3 is a partial cross-sectional view illustrating a fishing line guide body.

The holding body 21 and the tubular body 12 are connected so as to be integrally rotatable by a circumferential detent portion. As illustrated in FIG. 3, the circumferential detent portion of the present embodiment is configured by forming two ribs 12b protruding in a radial direction in the tubular body 12, and forming two corresponding recessed portions 21b such that the ribs 12b are fitted to the holding body 21. The rib 12b and the recessed portion 21b are formed at an interval of about 180° (including about 180°±20°), so that the holding body 21 is integrally rotationally driven together with the tubular body 12. Due to the fitting relationship between the rib 12b and the recessed portion 21b, the holding body 21 is guided to reciprocate in the left-right direction with respect to the tubular body 12 during the fishing line winding operation.

The holding body 21 comprises a cylindrical portion (configured in a cylindrical shape in the present embodiment) 21A that protrudes toward the front side and configures a front end portion of the level winding device 10, and an engagement pin 23 that engages with a spiral groove 11a formed in a surface of the worm shaft 11 is accommodated in the holding body through a long hole 12a formed in the tubular body 12.

Figure 2:
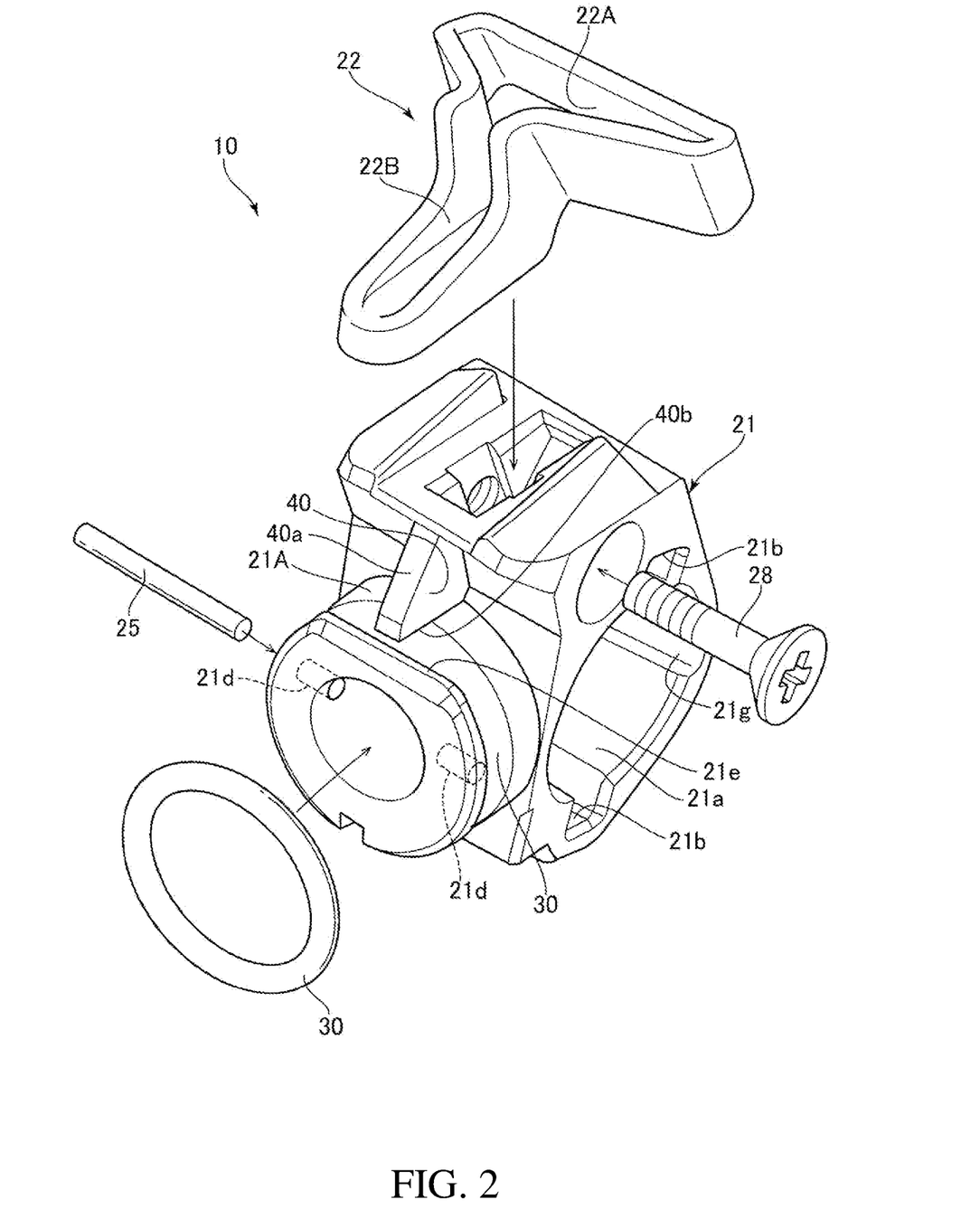
FIG. 2 is an exploded perspective view illustrating a structure of a fishing line guide body portion of the present embodiment.

The engagement pin 23 comprises an engagement portion 23a that engages with the spiral groove 11a and a main body 23b that is press-fitted into the cylindrical portion 21A. The engagement pin 23 is configured to be retained in a state of being press-fitted into the cylindrical portion 21A. As illustrated in FIG. 2, this retaining structure is configured by forming a through-hole 21d in a diameter direction of the cylindrical portion 21A, press-fitting the main body 23b of the engagement pin 23 into the cylindrical portion 21A, and press-fitting a retaining pin 25 in a state where the engagement portion 23a is engaged with the spiral groove 11a. In the present embodiment, the weight of the engagement pin 23 is reduced by forming a cavity portion 23c in the main body 23b, but the main body 23b may be configured in a solid state.

Furthermore, an O-ring 30 is attached to the cylindrical portion 21A in correspondence with a press-fitting position of the retaining pin 25 so that the retaining pin 25 does not come out in the radial direction. A fixing groove 21B is formed in the cylindrical portion 21A along the circumferential direction, and the retaining pin 25 is prevented from being detached from the cylindrical portion 21A by fitting the O-ring 30 into the fixing groove 21B.

The fishing line insertion portion 22 is fixed to the upper surface side of the holding body 21 by a fixing screw 28 or the like. Similarly to JP 2014-000045 A described above, the fishing line insertion portion 22 comprises an opening 22A in which an opening region is formed wide so as to reduce resistance at the time of releasing the fishing line, and a narrow portion 22B that guides the fishing line at the time of winding the fishing line, and is formed of a material having low fishing line resistance such as, for example, SUS or titanium. When the clutch is set to the OFF state, the holding body 21 is turned together with the tubular body 12, and the opening 22A is located in front of the spool 3 (fishing line releasing state), and when the clutch is set to the ON state, the holding body 21 is turned in the opposite direction together with the tubular body 12, and the narrow portion 22B is located in front of the spool 3 (fishing line guiding state).

According to the level winding device 10 having the configuration described above, when the clutch mechanism is turned OFF at the time of the casting operation, the opening 22A in which an opening region is formed wide is located in front of the spool, and thus the released fishing line does not receive a large resistance from the inner surface of the opening 22A, and stable casting can be performed while suppressing a decrease in the flying distance of the tackle. When the clutch mechanism is returned to ON, the narrow portion 22B is located in front of the spool (see FIG. 1). When the handle 5 is wound in this state, the fishing line guide body 20 (the fishing line insertion portion 22) is reciprocally driven in the left-right direction by the engagement pin 23 engaged with the spiral groove 11a of the rotatably driven worm shaft 11, so that the fishing line is evenly wound around the spool 3.

The rib 40 provided on the fishing line guide body 20 is integrally provided at the center of the holding body 21 so as to protrude forward. By forming such a rib 40, the fishing line is prevented from entering the gap or the stepped portion in the upper region of the cylindrical portion 21A to cause line entanglement.

The rib 40 is formed in a shape in which the fishing line that has caused the line trouble or the like easily comes off when coming into contact with the cylindrical portion 21A and the vicinity thereof (a shape in which the fishing line slides in a direction in which the fishing line comes off). That is, as illustrated in FIGS. 2 and 3, the front end edge 40a is inclined so as to approach the central portion of the holding body 21 as it transitions from the cylindrical portion 21A side to the upper side (the fishing line insertion portion 22 side), whereby the fishing line can be easily pulled out upward.

Furthermore, in the present embodiment, the O-ring 30 is attached to the cylindrical portion 21A in correspondence with the press-fitting position of the retaining pin 25 so that the retaining pin 25 does not come off in the radial direction. The fishing line may enter a gap between the O-ring 30 and the lower surface 40b of the rib 40 to cause line entanglement. Therefore, the O-ring 30 is preferably disposed so as to fill a gap between the lower surface 40b of the rib 40 of the cylindrical portion 21A and an opposing portion 21e facing each other in relation to the rib 40.

In the present embodiment, as described above, the fixing groove 21B for press-fitting and fixing the O-ring 30 is formed in the cylindrical portion 21A along the circumferential direction, so that the O-ring 30 is less likely to detach from the cylindrical portion 21A. The fixing groove 21B is not formed over the entire circumference of the cylindrical portion 21A, but is preferably formed excluding a region (opposing portion 21c) that becomes the opposing portion of the rib 40. As described above, since the groove is not formed in one part thereof, the fixing operation of the O-ring 30 can be easily performed, and the fishing line will not be caught since the fixing groove does not exist at a portion where the fishing line easily enters.

As described above, the holding body 21 and the tubular body 12 are formed with the circumferential detent portion (two ribs 12b formed in tubular body 12 and two recessed portions 21b formed in holding body 21) at an interval of approximately 180°, whereby both members are configured to be integrally rotatable. That is, by forming two circumferential detent portions at an interval of approximately 180° on the outer peripheral surface of the tubular body 12 and the inner peripheral surface of the holding body 21, when the tubular body 12 is rotated by operating the clutch mechanism, the holding body 21 (the fishing line insertion portion 22) can be rotated integrally with the tubular body 12.

In the present invention, the axial detent portion 50 is provided at an intermediate position between the two circumferential detent portions so as to prevent the holding body 21 from rattling in the axial direction of the tubular body 12. The axial detent portion 50 prevents rattling along the axial direction when the holding body 21 reciprocates in the horizontal direction via the worm shaft 11 and the engagement pin 23 through the winding operation of the handle. That is, in the configuration of the related art, as illustrated in FIGS. 6A and 6B, since only the circumferential detent portions are provided at intervals of approximately 180°, rattling (a rattling that swings around the holding body 21) occurs along the axial direction. This rattling occurs mainly when the tension of the fishing line acts on side surfaces 22B1 and 22B2 of the narrow portion 22B of the fishing line insertion portion 22 during the winding operation of the fishing line.

Specifically, when the tension of the fishing line acts on the side surface 22B1 of the narrow portion 22B along with the movement of the holding body 21 in the left-right direction, a force in the D2 direction acts on one end side of the holding body 21, which causes rattling. In addition, when the tension of the fishing line acts on the side surface 22B2 of the narrow portion 22B, a force in the D3 direction acts on the other end side of the holding body 21, which causes rattling. In this case, if a gap G is generated between the inner peripheral surface of the holding body 21 and the outer peripheral surface of the tubular body 12 due to dimensional tolerance, the rattling becomes large.

Therefore, by providing the axial detent portion 50 that prevents the holding body 21 from rattling along the axial direction at the intermediate position between the two circumferential detent portions so as to suppress the rattling described above, it is possible to suppress the holding body 21 from rattling in the axial direction of the tubular body 12. In the present embodiment, as illustrated in FIGS. 4 to 6B, the axial detent portion 50 is configured by a convex portion 12g formed on the outer peripheral surface of the tubular body 12 and a concave groove 21g formed on the inner peripheral surface of the holding body 21.

By providing such an axial detent portion 50, the movement of the holding body 21 in the D2 and D3 directions is restricted by an upper surface 12g' of the convex portion 12g and a bottom surface 21g' of the concave groove 21g abutting on the rattling acting on the holding body 21 at the time of the fishing line winding operation as described above, and the rattling due to the movement in the D2 and D3 directions as illustrated in FIGS. 6A and 6B can be suppressed. That is, when the fishing line is wound around the spool, rattling along the axial direction is suppressed even if the holding body 21 holding the fishing line insertion portion 22 is reciprocally driven between the left and right side plates. Therefore, the fishing line can be accurately wound around the spool, and generation of the abnormal noise due to the rattling is also suppressed, so that the fishing reel can be improved in a sense of precision. Furthermore, by providing the axial detent portion 50, the turning operation of the fishing line guide body can be more stably performed.

Figure 4:
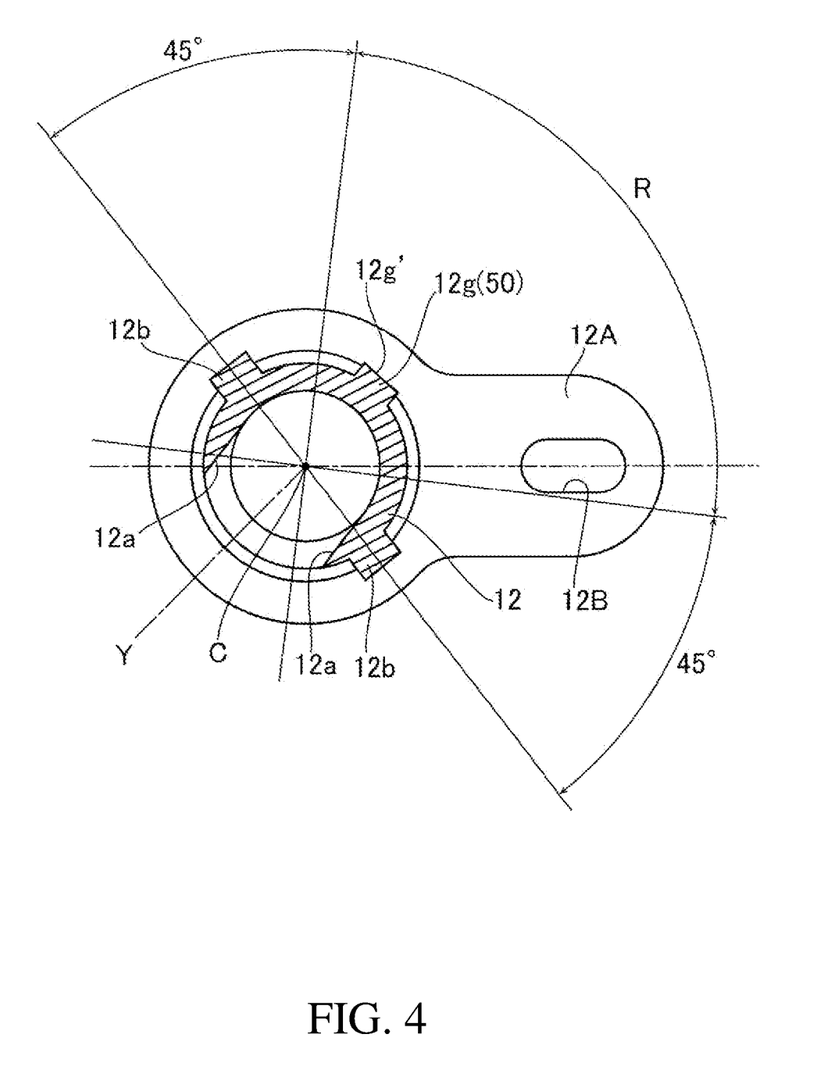
FIG. 4 is a schematic view illustrating a configuration of a tubular body.
Figure 5A:
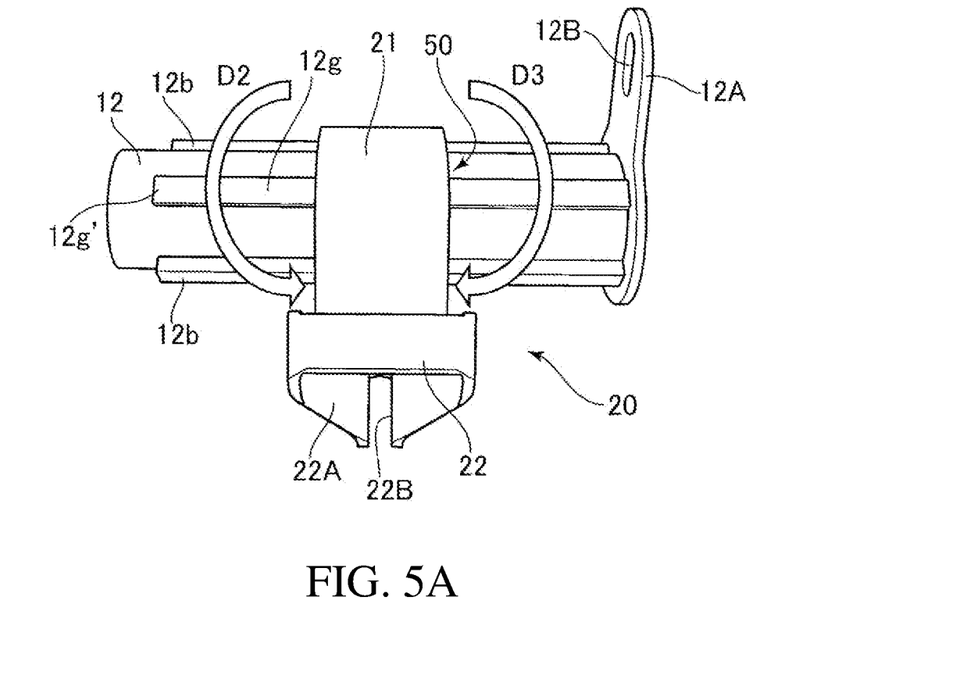
FIG. 5A is a front view for explaining the action of the fitting relationship illustrated in FIG. 4.
Figure 5B:
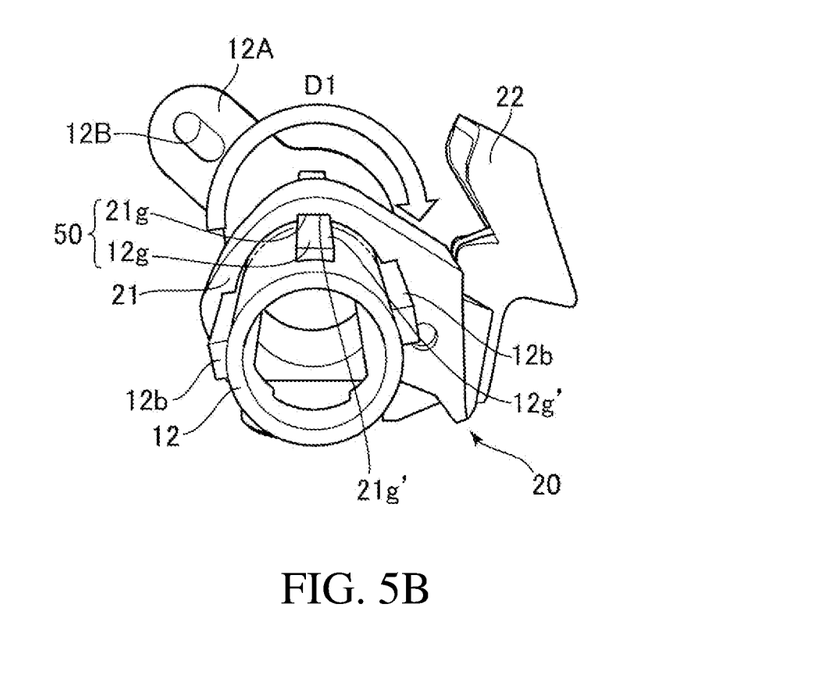
FIG. 5B is a side view of FIG. 5A.

The above-described position where the axial detent portion 50 is provided may be an intermediate position between the two circumferential detent portions, but the axial detent portion is preferably provided within a range R separated by 45° or more in the circumferential direction from each circumferential detent portion (the position where the rib 12b is formed) (see FIG. 4). By providing the axial detent portion 50 within such a range R, rattling can be stably suppressed. In particular, the axial detent portion 50 is preferably provided in a range facing the engagement pin 23 engaged with the spiral groove of the worm shaft 11. That is, when the engagement pin 23 is engaged with the spiral groove 11a of the worm shaft 11 through the long hole 12a of the tubular body 12, a large force is generated along the axial direction at this engagement portion. Therefore, as illustrated in FIG. 4, by providing the axial detent portion 50 (the convex portion 12g) on the line Y connecting the center of the engagement pin and the axis C of the tubular body 12, rattling can be more effectively suppressed.

In fact, when a comparative test was conducted on the occurrence of rattling under the same conditions for the configuration in which the axial detent portion 50 was not provided (FIGS. 6A and 6B) and the configuration in which the axial detent portion 50 was provided (FIGS. 5A and 5B), it was confirmed that the rattling was reduced by 10% at the minimum and 35.9% at the maximum in the configuration in which the axial detent portion 50 was provided.

Figure 7:
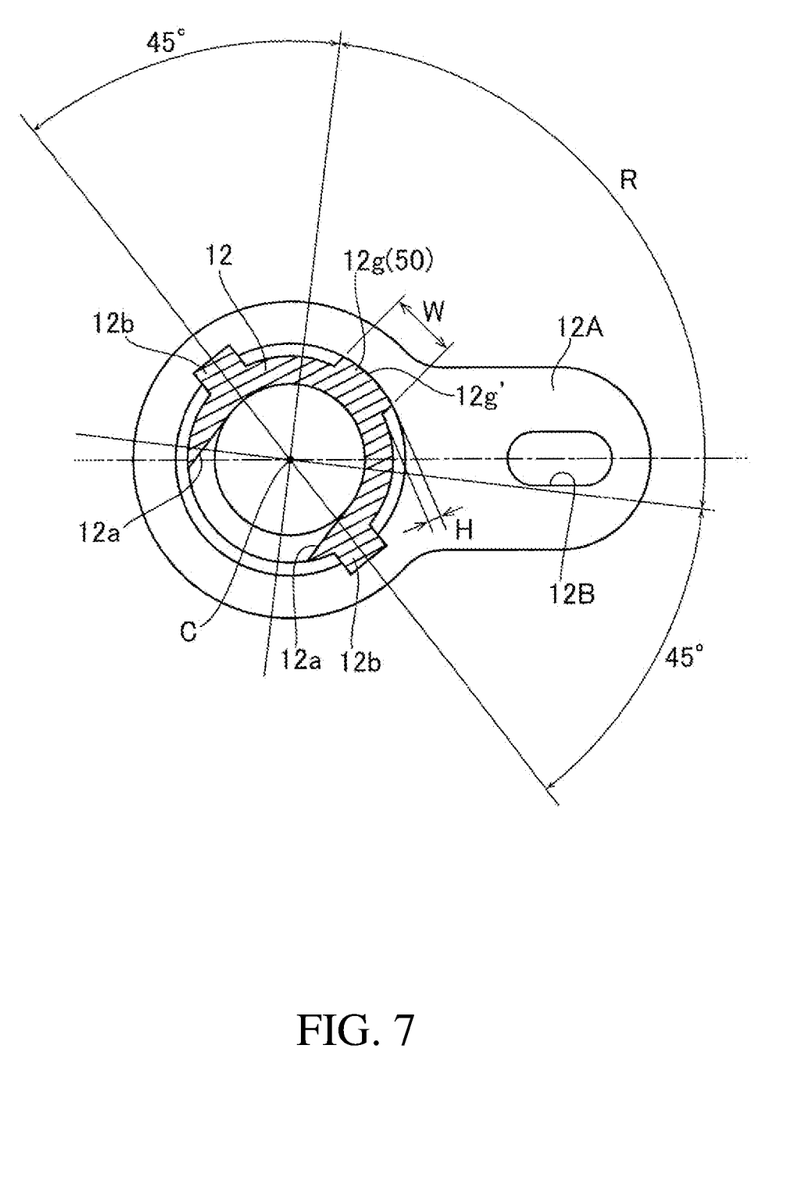
FIG. 7 is a schematic view illustrating another configuration of the tubular body.

FIG. 7 is a schematic view illustrating another configuration of the tubular body 12. As shown in this embodiment, it is preferable that the convex portion 12g constituting the axial detent portion 50 has a height H lower than each rib 12b of the two circumferential detent portions, and a width W thereof is formed wider.

As described above, by forming the convex portion 12g of the axial detent portion 50 to have a small height and a large width, the concave groove can be made shallow to prevent a decrease in strength, and the contact area between the upper surface 12g' of the convex portion 12g and the bottom surface of the concave groove 21g is increased, so that rattling can be more effectively suppressed.

The embodiments according to the present invention have been described above, but the present invention is not limited to the embodiments and may be modified in various ways.

The present invention has features in the portion of the fishing line guide body 20 (the holding body 21) and the tubular body 12 of the level winding device 10, and other configurations, for example, the size and shape of the reel main body, other functional members, and the like are not particularly limited. Furthermore, the configuration of the fishing line insertion portion 22, the holding structure of the engagement pin engaged with the screw shaft, and the like can also be appropriately modified.

In addition, two or more axial detent portions 50 may be provided as long as the axial detent portions are disposed at intermediate positions between the two circumferential detent portions. Further, when the axial detent portion 50 is formed in the fitting relationship between the convex portion 12g and the concave groove 21g, the axial detent portion can be appropriately deformed in terms of its height, width, groove depth, and the like.

What is claimed is:

1. A fishing reel, comprising:
   a spool rotatably supported between left and right side plates of a reel main body;
   a clutch mechanism that switches the spool between a fishing line winding state and a fishing line releasing state; and
   a level winding device that evenly winds a fishing line around the spool when the clutch mechanism rotates a handle in an ON state,
   wherein the level winding device comprises a tubular body rotatably supported between left and right side plates of a reel main body and configured to rotate in conjunction with ON and OFF operation of the clutch mechanism, a worm shaft accommodated in the tubular body and rotationally driven by a rotational operation of the handle, a holding body comprising an engagement pin engaged with a spiral groove of the worm shaft and configured to hold a fishing line insertion portion through which a fishing line is inserted, and two circumferential detent portions provided in the holding body and the tubular body so that the holding body and the tubular body integrally rotate,
   the two circumferential detent portions are provided on the tubular body at an interval of approximately 180°, and
   an axial detent portion that prevents the holding body from rattling in the axial direction of the tubular body is provided at an intermediate position between the two circumferential detent portions.

2. The fishing reel according to claim 1, wherein the two circumferential detent portions comprise two ribs formed on an outer peripheral surface of the tubular body at an interval of approximately 180° and two recessed portions formed at corresponding positions of the holding body, and the axial detent portion is provided within a range separated by 45° or more in the circumferential direction from a position where the two ribs are formed.

3. The fishing reel according to claim 2, wherein the axial detent portion is provided within a range facing the engagement pin.

4. The fishing reel according to claim 2, wherein the axial detent portion is formed on an outer peripheral surface of the tubular body, and comprises a convex portion having a height lower than those of the two ribs and a width larger than those of the two ribs.

* * * * *